Oct. 1, 1940.  J. J. HOLLANDER  2,216,530
SOLDERING IRON
Filed Jan. 27, 1939
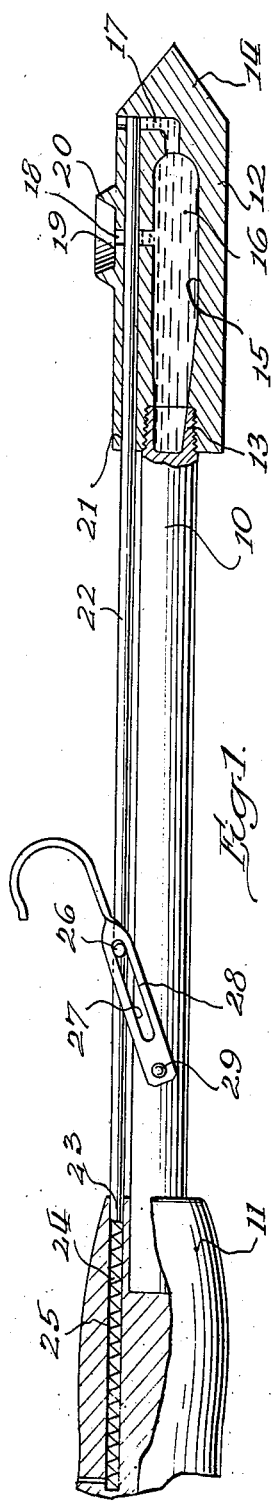
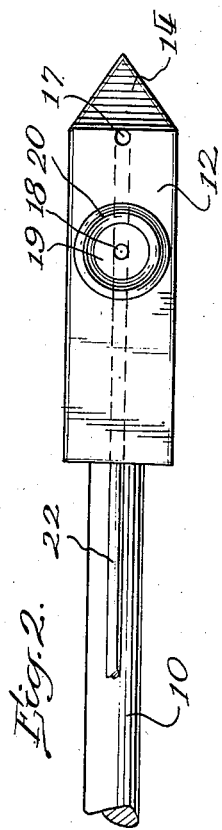
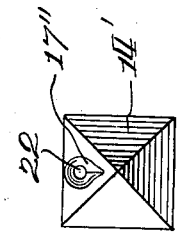
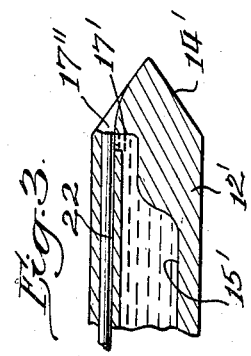
Inventor
Joseph J. Hollander
By Maurice S. Cayne
Atty.

Patented Oct. 1, 1940

2,216,530

UNITED STATES PATENT OFFICE 2,216,530

SOLDERING IRON

Joseph J. Hollander, Chicago, Ill.

Application January 27, 1939, Serial No. 253,042

4 Claims. (Cl. 113—109)

This invention relates to a new and improved construction of soldering iron provided with reservoirs for the holding of solder in a hot fluid condition therein.

The object of this invention is to provide a soldering iron of the character described, which will include a reservoir within the "copper" or head of said iron, means from said reservoir leading to the tip of said iron, means leading from the side of said copper, and means operable by the finger of the holder of said iron for uncovering both the means leading to the tip of said copper and the means leading from the side of said copper.

A further object of this invention is to provide in a soldering iron of the character described, provided within the copper thereof with a reservoir, simple, effective, and efficient, means for uncovering openings leading to and from said reservoir, said means consisting merely of two moving members and a spring.

A further object of this invention is to provide in a soldering iron of the character described, new and improved means about the entrance to a reservoir provided within the head of said soldering iron, said new and improved means consisting of an integral lip or ridge about said entrance which will facilitate the pouring of molten solder or the feeding of ribbon or bar solder into said entrance and thence to said reservoir.

Still a further object of this invention is to provide in a device of the character described a simple and effective construction which will be conducive for economical manufacture in large quantities.

With the foregoing and other objects in view which will appear as the description proceeds, the invention consists in certain novel features of construction, arrangement and combination of parts hereinafter fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing, a preferred embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Fig. 1 is a sectional view of an embodiment of the present invention with portions thereof in elevation;

Fig. 2 is a fragmentary plan view of a portion of the embodiment of the present invention illustrated in Fig. 1;

Fig. 3 is a fragmentary sectional view of a further embodiment of the present invention;

Fig. 4 is an end-on elevational view of the embodiment illustrated in Fig. 3.

In the preferred embodiment, the invention consists of a conventionally constructed soldering iron, provided in the "copper" or head thereof, with a reservoir adapted to contain molten solder which is to be fed to the work via means provided in the head of said iron. Means provided for the uncovering of the feeding means consists of a finger operated rod, and serves also to uncover the entrance to said reservoir when desired. Said rod is inserted in the handle of said iron and is normally urged to a closed position by spring means provided also in the handle of said soldering iron. Novel means are provided about the entrance to the reservoir and consist of an upstanding ridge adapted to confine flowing solder and the like.

Referring now to more specific constructional details, the reference character 10 designates a rod member, one end of which is set into a handle 11, and the other end of which is inserted and fixed in the operating portion or "copper" 12 by means of the threaded portion 13 or the like. Said copper is provided on the unattached end thereof with a contacting portion or "tip" 14 wherewith the soldering iron is applied to work. Centrally of the copper 12 a reservoir 15 is formed, said reservoir being adapted to contain molten solder 16 for dispensing the same to the work.

The reservoir 15 is connected by means of the channels 17 and 18 to the outer portion of the copper 12, the channel 17 serving as the outlet and leading to a position adjacent to the tip 14, and the channel 18 serving as the inlet and leading to the side of the copper at 19. Said entrance 19 is formed in the shape of a vessel or the like by reason of the upstanding ridge 20 about said entrance 19 acting as the walls thereof. Said vessel or basin 19 facilitates the pouring of molten solder into the reservoir 15 when the iron is in the position shown in Fig. 1, or directs solder from bars or sticks into the channel 18 when such bars or sticks are placed against the copper 12 with the end of said bars or sticks within the confines of said ridge 20 in said basin 19.

The embodiment illustrated in Figs. 3 and 4 is provided with a reservoir 15' of slightly different shape from that described above, said reservoir 15' leading directly to the tip 14' via a V-shaped channel 17" being connected with the channel 17'.

In each of the embodiments illustrated, a longitudinal channel 21 is provided through the copper 14 for the accommodation of a rod member 22, which is slidingly fitted therein. Said channel 21 is so positioned that when said rod member 22 is in place, channels 17 or 17' and 18 are completely blocked, permitting neither ingress nor egress for solder, from or to the reservoir 15 or 15'. The end 23 of said rod member 22 opposite to the end inserted in the copper 14, is slidingly inserted in the entrance of a chamber 24 provided in the handle 11. Within said chamber 24 and below said end 23 a spring 25 is disposed, said spring serving to normally urge said rod member 22 to a "closed" position with respect to the channels 17 or 17' and 18.

Intermediate the ends of said rod member 22 a pin 26 is fixed. Said pin 26 rides in the slot 27 of a finger-operated member 28 which is pivotally pinned as at 29 to the rod member 10.

It will be seen that as the member 28 is moved a small amount in a counter-clockwise direction about the pin 29, the member 22 is caused to move a small amount to the left against the force of the spring 25, freeing the channel 17 or 17' so that a desired amount of molten solder 16 can flow from the reservoir 15 or 15' to the tip 14 or 14'. When the member 28 is released, the spring causes the rod member 22 to move to the right and block the path of the solder through the channel 17 or 17'.

If the member 28 is rotated counter-clockwise to its extreme point of motion, the member 22 is moved to the left a distance sufficient to uncover the channel 18 as well as the channel 17 or 17'. In the present position, solder may be poured into the basin 19 to enter the reservoir through the channel 18, until same is full. If molten solder is not available, a stick or bar may be inserted in said basin, the heat of the copper 12 serving to melt the end and the confinement of the ridge 20 causing the melted solder to flow to the reservoir. Inasmuch as the channel 17 or 17' is uncovered during this process, it is a simple matter to determine when the reservoir 15 or 15' is full, thus preventing messiness and overflow of the reservoir in filling same.

When the reservoir 15 or 15' is filled, the finger member 28 is released and the rod member 22 returns to the closed position, the soldering iron being ready for use.

While it has been implied that the present invention is used in connection with soldering irons which are externally heated, such as by ovens, blow torches and the like, the same invention may also be embodied in soldering irons heated internally as by electric elements, exothermic chemicals, and the like.

The use of the word "copper" herein refers to the operating portion of a soldering iron or the like, rather than to a member of any particular metal.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

I claim:

1. In a device of the character described comprising a handle, a copper, and connecting means between said handle and said copper, a reservoir formed centrally of said copper for carrying a supply of molten metal, channels from said reservoir leading to the outside of said copper, a channel transverse to said first-mentioned channels intersecting therewith, a member disposed in said transverse channel and adapted to block said first-mentioned channels to confine said molten metal, said member being movable out of said transverse channel for consecutively uncovering said first mentioned channels, and means for manually operating said movable member.

2. In a device of the character described comprising a handle, a copper, and connecting means between said handle and said copper, a reservoir formed centrally of said copper for carrying a supply of molten metal, channels from said reservoir leading to the outside of said copper, a channel transverse to said first-mentioned channels intersecting therewith, a member disposed in said transverse channel and adapted to block said first-mentioned channels to confine said molten metal, said member being movable out of said transverse channel for consecutively uncovering said first-mentioned channels, and means for manually operating said movable member, said means comprising a slotted member engaging said movable member and pivotally attached to said connecting means.

3. In a device of the character described comprising a handle, a copper, and connecting means between said handle and said copper, a reservoir formed centrally of said copper for carrying a supply of molten metal, channels from said reservoir leading to the outside of said copper, a channel transverse to said first-mentioned channels intersecting therewith, a member disposed in said transverse channel and adapted to block said first-mentioned channels to confine said molten metal, said member being movable out of said transverse channel for consecutively uncovering said first-mentioned channels, means for manually operating said movable member, said means comprising a slotted member engaging said movable member and pivotally attached to said connecting means, and means for normally urging said movable means to a position blocking said first-mentioned channels.

4. In a device of the character described, a handle, a copper, connecting means between the handle and the copper, a reservoir provided centrally of the copper for retaining molten metal therewithin, said copper being provided with a funnel-shaped opening leading to said reservoir, said reservoir having a channel at its forward end leading to the operating portion of the copper for permitting the flow of molten metal thereto, reciprocable blocking means operable to block said channel and passageway when at one end of its stroke thereby confining a quantity of molten metal therewithin, uncover the channel at its half stroke, and uncover both the channel and the passageway at the second end of its stroke, and means for causing the reciprocation of said blocking means.

JOSEPH J. HOLLANDER.